US009262254B2

(12) United States Patent
Bertosa et al.

(10) Patent No.: US 9,262,254 B2
(45) Date of Patent: Feb. 16, 2016

(54) METHOD AND APPARATUS TO MANAGE INFORMATION BETWEEN A SCAN TOOL AND NETWORKED DEVICES

(75) Inventors: Thomas Bertosa, Chardon, OH (US); Michael Gessner, Akron, OH (US); James Fish, Birmingham, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 617 days.

(21) Appl. No.: 13/164,087

(22) Filed: Jun. 20, 2011

(65) Prior Publication Data

US 2012/0324075 A1    Dec. 20, 2012

(51) Int. Cl.
G06F 15/173 (2006.01)
G06F 11/07 (2006.01)
H04L 29/08 (2006.01)
G06F 11/22 (2006.01)

(52) U.S. Cl.
CPC .......... *G06F 11/079* (2013.01); *G06F 11/2294* (2013.01); *H04L 67/12* (2013.01)

(58) Field of Classification Search
USPC .................. 709/217, 218, 223, 224, 225, 226
See application file for complete search history.

(56) References Cited

U.S. PATENT DOCUMENTS

| | | | |
|---|---|---|---|
| 7,502,672 B1* | 3/2009 | Kolls | 701/31.6 |
| 2001/0033225 A1* | 10/2001 | Razavi et al. | 340/425.5 |
| 2003/0145075 A1 | 7/2003 | Weaver et al. | |
| 2005/0060070 A1* | 3/2005 | Kapolka et al. | 701/29 |
| 2005/0096805 A1* | 5/2005 | Fudali et al. | 701/29 |
| 2006/0030952 A1 | 2/2006 | Sprogis et al. | |
| 2006/0095174 A1* | 5/2006 | Sonnenrein et al. | 701/33 |
| 2007/0005201 A1 | 1/2007 | Chenn | |
| 2007/0043488 A1* | 2/2007 | Avery et al. | 701/33 |
| 2007/0050106 A1* | 3/2007 | Chinnadurai | 701/29 |
| 2008/0059080 A1 | 3/2008 | Greiner et al. | |
| 2008/0177438 A1 | 7/2008 | Chen et al. | |
| 2010/0023203 A1* | 1/2010 | Shibi | 701/33 |
| 2010/0321175 A1* | 12/2010 | Gilbert | 340/438 |
| 2011/0166739 A1* | 7/2011 | Oesterling | 701/30 |
| 2012/0136802 A1* | 5/2012 | McQuade et al. | 705/347 |

OTHER PUBLICATIONS

International Search Report (ISR) as issued by the USPTO in connection with corresponding International Patent Application No. PCT/US12/43200; ISR dated Sep. 6, 2012.
European Search Report issued in European Patent Application No. 12803331.3, mailed on Feb. 25, 2015.

* cited by examiner

*Primary Examiner* — Abdullahi E Salad
*Assistant Examiner* — Van Kim T Nguyen
(74) *Attorney, Agent, or Firm* — Baker & Hostetler LLP (57) ABSTRACT

A system and method for managing information between a diagnostic tool and a networked computing device are provided. The system made up of a diagnostic tool for retrieving information from a vehicle under test, a networked computing device for providing information concerning the vehicle under test, and an information management device for assisting communication between the diagnostic tool and the networked computing device. Information is gathered by the diagnostic tool and sent to the information management device which determines how to process the information, which may then be sent to the networked computing device for processing and returning relevant data to the information management device, and potentially to the diagnostic tool.

18 Claims, 3 Drawing Sheets

METHOD AND APPARATUS TO MANAGE INFORMATION BETWEEN A SCAN TOOL AND NETWORKED DEVICES

FIELD OF THE INVENTION

The present invention relates generally to diagnostic equipment. More particularly, the present invention relates to managing the flow of information within a system based upon results of a diagnostic procedure for different types of diagnosed items, for example, a vehicle.

BACKGROUND OF THE INVENTION

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics.

With equipment and products becoming more advanced and more complex with the addition of electronic components, the knowledge base required to properly use, maintain, and fix these items has grown immensely. Moreover, the amount of peripheral information relating to the use, maintenance, and repair of the equipment and products has also increased. Access to all of this information is crucial to proper and efficient use, maintenance, and repair of the equipment and products. But, access alone is insufficient. For the best results for using the available information, it must be accessible in a timely manner, generally the faster the better, it must be accurate, and one must know how to use it. However, all of this may be very daunting for even one piece of equipment or product. The management of all of this information only increases with every piece of equipment or product used, maintained, or fixed. Today, such large amounts of information may be managed from locations remote to a diagnostic tool and delivered to a user electronically.

It is desirable to provide a method and apparatus to mange the flow of information between a diagnostic tool and a remote source of information for delivery and use by a user. Moreover, the method and apparatus may be able to manipulate or analyze data to aid in the use of the information by the user.

SUMMARY OF THE INVENTION

The foregoing needs are met, to a great extent, by the present invention, wherein in one aspect, a method and apparatus are provided such that in some embodiments allows a scan tool to receive information regarding potential fixes and parts information.

In accordance with one embodiment of the present invention, a base computing device for managing information between a portable vehicle diagnostic tool and a networked computing device over a communication network, the base computing device can include a processor configured to execute modules, a memory configured to store the modules, and a communication interface configured to wirelessly communicate with the portable vehicle diagnostic tool and the networked computing device over the communication network, wherein the communication interface allows information in real time to be exchanged between the portable vehicle diagnostic tool and the networked computing device, and wherein the modules can include an instruction module configured to determine whether to execute one or more modules configured to process signals received from the portable vehicle diagnostic tool and the networked computing device, and a pass-through module configured to transmit the signals from the portable vehicle diagnostic tool and the networked computing device to the other of the devices with an information represented in the signals in a same condition as received.

In accordance with yet another embodiment of the present invention, a method for managing information between a diagnostic tool and a networked computing device over a communication network, the steps can include connecting wirelessly a base computing device to the diagnostic tool and the networked computing device over the communication network via a communication interface of the base computing device, receiving signals in real time representative of information from the diagnostic tool or the networked computing device via the communication interface, determining in real time whether to execute an information processing function, stored in a memory of the base computing device, via a processor of the base computing device, executing one or more of the information processing functions via the processor, and sending output signals in real time to the diagnostic tool representative of a returned information based on the information received from the diagnostic tool via the communication interface.

In accordance with still another embodiment of the present invention, a base computing device for managing information between a portable vehicle diagnostic tool and a networked computing device over a communication network, the base computing device can include a means for processing modules, a means for storing the modules, and a means for wirelessly communicating with the portable vehicle diagnostic tool and the networked computing device over the communication network, wherein the means for wirelessly communicating allows information in real time to be exchanged between the portable vehicle diagnostic tool and the networked computing device, and wherein the modules include an instruction module configured to determine whether to execute one or more modules configured to process signals received from the portable vehicle diagnostic tool and the networked computing device, and a pass-through module configured to transmit the signals from the portable vehicle diagnostic tool and the networked computing device to the other of the devices with an information represented in the signals in a same condition as received.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and system for managing information can provide a portable vehicle diagnostic tool to identify a failed vehicle component. The portable vehicle diagnostic tool can perform a combination of functions. Such functions may include diagnostic testing on vehicle components and systems. The portable vehicle diagnostic tool may use its functionality to help a technician determine if there is a vehicle component failure and if so, which component has failed.

The method and system may further provide an information management device. The information management device may serve to receive information from a variety of sources, such as the diagnostic tool and other networked computing devices, and route the information received to the appropriate destination. Further, the information management device may be able to analyze data and interpret information to aid a user of the diagnostic tool in making, using, maintaining, and fixing a piece of equipment or product. In one embodiment, information management device may receive, route, and/or analyze the information in real-time.

Figure 1:
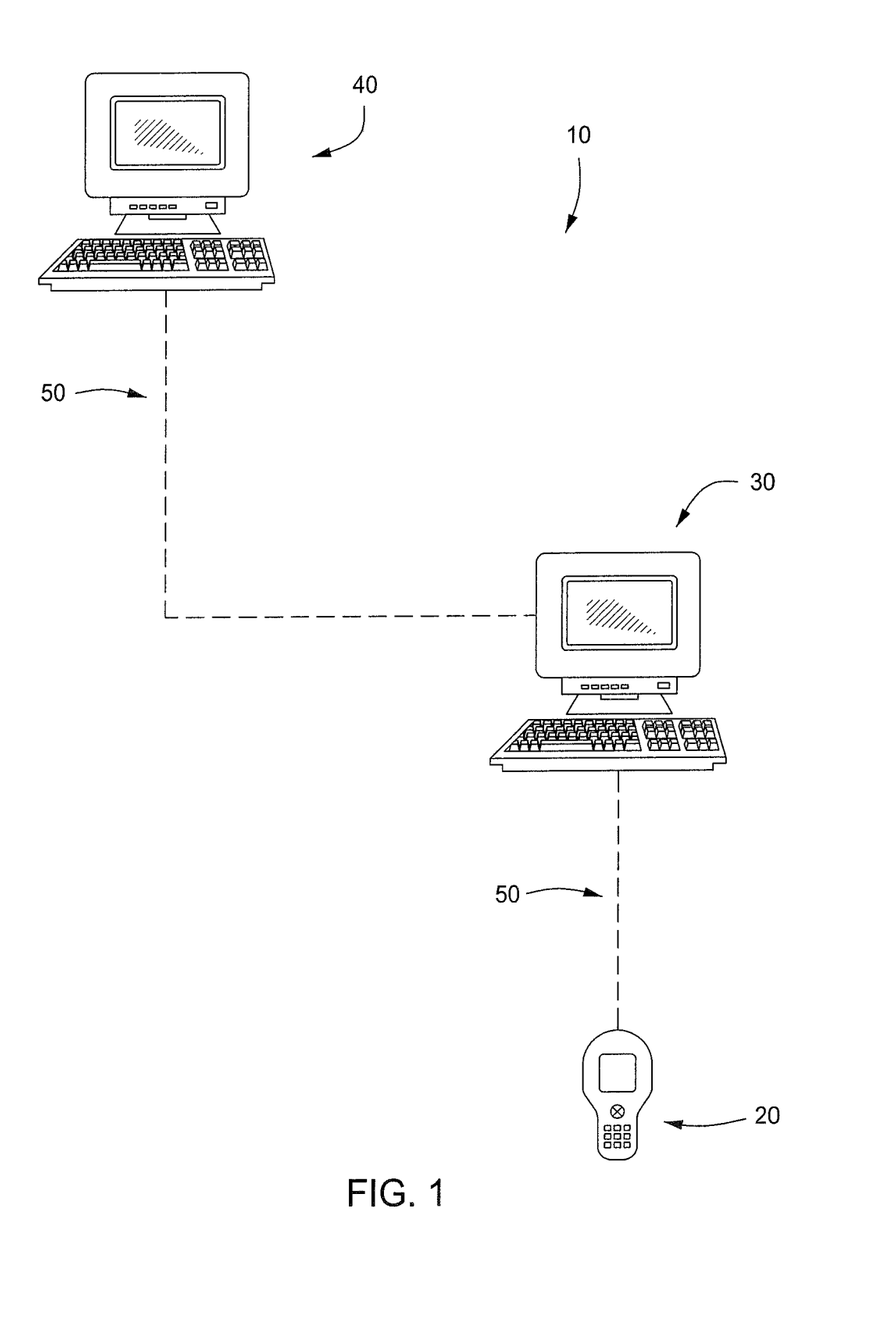
FIG. 1 is a schematic diagram illustrating a system for managing information between a diagnostic tool and networked computing devices according to an embodiment of the invention.

The invention will now be described with reference to the drawing figures, in which like reference numerals refer to like parts throughout. An embodiment of the present inventive system is illustrated in FIG. 1, which illustrates a system for managing information between a diagnostic tool and networked computing devices 10 (information management system) according to an embodiment of the invention. The information management system 10 can gather, in real time, data about the failure of a component and combine data from various sources to provide desired information to the user. The information provided to the user, or culminated information, provides pertinent information about component failures to the user, though the culminated information is not limited to solely component failure information as described herein. Through application of the information management system 10, the user receiving the culminated information on the failed components can make reactionary decisions to the information, such as to modify an action that causes an increased component failure, or conducting component maintenance or repairs.

The information management system 10 may include a portable vehicle diagnostic tool 20, an information management device 30, and a networked computing device 40. There can be as many (in various number of combinations) portable vehicle diagnostic tool, information management device and networked computing devices as desired. Each of the portable vehicle diagnostic tool 20, the information management device 30, and the networked computing device 40, may include an input device, a memory, a communication device, a processor, and a display, all of which may be interconnected by a data link. The portable vehicle diagnostic tool 20, the information management device 30, and the networked computing device 40 may be, for example, a general computing device, such as a personal computer (PC), a notebook, a tablet, a UNIX workstation, a server, a mainframe computer, a personal digital assistant (PDA), smartphone, cellular phone, or some combination of these. Alternatively, the portable vehicle diagnostic tool 20, the information management device 30, and the networked computing device 40 may be a specialized computing device, such as a vehicle diagnostic scan tool. The remaining components may include programming code, such as source code, object code or executable code, stored on a computer-readable medium that may be loaded into the memory and processed by the processor in order to perform the desired functions of the information management system 10.

In various embodiments, the portable vehicle diagnostic tool 20, the information management device 30, and the networked computing device 40 may be coupled to a communication network 50, which can include any viable combination of devices and systems capable of linking computer-based systems, such as the Internet; an intranet or extranet; a local area network (LAN); a wide area network (WAN); a direct cable connection; a private network; a public network; Zigbee; an Ethernet-based system; a token ring; a value-added network; a telephony-based system, including, for example, T1 or E1 devices; an Asynchronous Transfer Mode (ATM) network; a wired system; a wireless system; an optical system; cellular system; satellite system; a combination of any number of distributed processing networks or systems or the like. The communication network 50 allows for communication between the portable vehicle diagnostic tool 20, the information management device 30, and the networked computing device 40.

The portable vehicle diagnostic tool 20, the information management device 30, and the networked computing device 40 may be coupled to the communication network 50 by way of the communication device, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the information management system 10 may communicate information to the user through the display and request user input through the input device, by way of an interactive, menu-driven, visual display-based user interface, or graphical user interface (GUI). Alternatively, the communication may be text based only, or a combination of text and graphics. The user interface may be executed, for example, on a personal computer (PC) with a mouse and keyboard, with which the user may interactively input information using direct manipulation of the GUI. Direct manipulation may include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

Some applications of the information management system 10 may not require that all of the elements of the system be separate pieces. For example, in some embodiments, combining the portable vehicle diagnostic tool 20 and the information management device 30 or the diagnostic tool 20 and the networked computing device 40 may be possible. Such an implementation may be usefully in a small shop where only a small number of portable vehicle diagnostic tools 20 are used or that the diagnostic tool can directly communicate with the networked computing device.

Alternatively, having the portable vehicle diagnostic tool 20, the information management device 30, and the networked computing device 40 as separate devices within the information management system 10 provides certain flexibilities. For example, in a nationwide implementation, the networked computing device 40 may be a centralized device hosted by an entity in a remote location. Then individual service shops, for example, may each have the information management device 30 that connects to the networked computing device 40 to retrieve the pertinent information, which may include some or all of the culminated information. Further, large service shops may have multiple portable vehicle diagnostic tools 20 to provide information to one or multiple information management devices 30. However, some of these implementations may have greater costs associated with them because of all the separate pieces. Therefore, the information management system 10 encompasses multiple embodiments. As further discussed below, the components that make up the information management system 10 communicate with each other in real time so that the information desired by the user of the scan tool may be ready in real time and automatically presented to the user.

Figure 2:
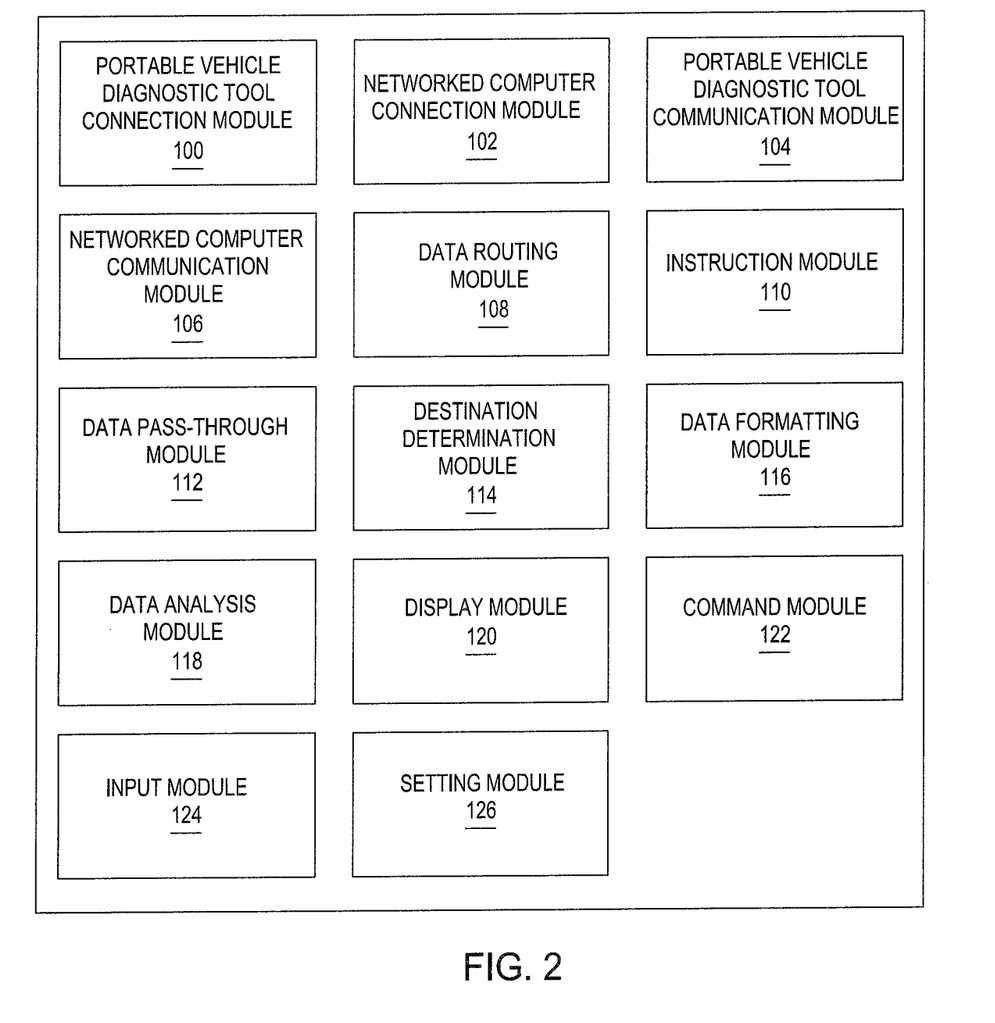
FIG. 2 is a block diagram illustrating the modules of an information management device of a system for managing information between a diagnostic tool and networked computing devices according to an embodiment of the invention.

Referring now to FIG. 2, the memory of the information management device 30 may store a variety of programmed software modules which may be executed by the information management device's processor. The modules may include: a portable vehicle diagnostic tool connection module 100, a networked computer connection module 102, a portable vehicle diagnostic tool communication module 104, a networked computer communication module 106, a data routing module 108, an instruction module 110, a data pass-through module 112, a destination determination module 114, a data formatting module 116, a data analysis module 118, a display module 120, a command module 122, an input module 124, and a settings module 126.

Generally, the information management device 30 connects to the portable vehicle diagnostic tool 20 and the networked computing device 40 via the communication network 50. Information that the portable vehicle diagnostic tool 20 retrieves from the vehicle, such as engine control unit and vehicle system data, which may include diagnostic and failure codes, performance measurements, parts and software identifiers, etc., may be received by the information management device 30 from the portable vehicle diagnostic tool 20. The information management device 30 may then provide the information, in either the form in which it was received or in an altered form, to the networked computing device 40 via the communication network 50. The networked computing device 40 may then conduct any combination of forwarding the data, as received or altered, to another networked computing device 40, returning data to the information management device 30 resulting from an analysis of the date received, and returning data requested by the information management device 30. The information management device 30 may then pass the information received from the networked computing device 40, either as received or altered, to the portable vehicle diagnostic tool 20, where it may be displayed to the used. The functions of the information management device 30 may vary from one embodiment to and are discussed further herein.

Moreover, any of the functions discussed herein may be executed in real-time, thus making the processes, for which the information management system 10 is implemented, faster and more efficient. Functions may be executed in real-time independently from other functions, thus not relying on the entire information management system 10 to be implemented in real-time for some real-time functionality to be available.

The portable vehicle diagnostic tool connection module 100 may either initiate a connection between the information management device 30 and the portable vehicle diagnostic tool 20, or respond to a request to initiate the connection between the two devices. The portable vehicle diagnostic tool connection module 100 is configured to communicate in various communication protocols of various makers of the portable vehicle diagnostic tool 20. In one embodiment, the portable vehicle diagnostic tool connection module 100 may engage the communication device of the information management device 30 to send a connection signal to, and then receive a connection confirmation or denial signal from the communication device of the portable vehicle diagnostic tool 20. In an alternative embodiment, the portable vehicle diagnostic tool connection module 100 may engage the communication device of the information management device 30 to listen for a connection signal from the communication device of the portable vehicle diagnostic tool 20. Upon receiving the connection signal, the portable vehicle diagnostic tool connection module 100 may identify the portable vehicle diagnostic tool 20 by, for example, make and model, serial number, and username and password, and then determine the appropriate connection response for either accepting or denying the connection, and sending a response signal. Moreover, the portable vehicle diagnostic tool connection module 100 may also be responsible for terminating an established connection in an analogous manner, either initiating or responding to a connection termination request.

Similar to the portable vehicle diagnostic tool connection module 100, the networked computer connection module 102 may also initiate or respond to connection or termination request signals with the communication device of the networked computing device 40. While the portable vehicle diagnostic tool connection module 100 and the networked computer connection module 102 may be similar in function and execution, differences may arise. For example, selecting the appropriate protocol for the connection between the information management device 30 and the other devices 20, 40, may differ based on the technology used in each, potentially influenced by cost, efficiency, and environment. In some instances a Wi-Fi or similar short range wireless protocol, like Bluetooth, ZigBee, or Near Field Communication, may be used to connect the information management device 30 with the portable vehicle diagnostic tool 20 when they are located within a small enough area. However, an internet protocol, such as TCP/IP, may be implemented to connect the information management device 30 and the networked computing device 40 if they are located on an expansive network like the internet. Many varying combinations of networks and protocols may be implemented to connect the devices 20, 30, 40 in various combinations together.

In another embodiment, the portable vehicle diagnostic tool connection module 100, and the networked computer connection module 102 may be one communication module.

Once the connection between the information management device 30 and at least one of the other two devices 20, 40, is established, the portable vehicle diagnostic tool communication module 104 and/or the networked computer communication module 106 may engage the communication device of the information management device 30 to transmit and receive information. The communication between the information management device 30 and the other two devices 20, 40, may involve the information management device 30 sending an initial query or request for information and then receiving information in response, or initially receiving information without first making a query or request.

In some embodiments more than one portable vehicle diagnostic tool 20 and/or more than one networked computing device 40 are connected to the information management device 30. In such instances, the information management device 30 may be sending data to and/or receiving data from multiple sources. The data routing module 108 may manage the incoming and outgoing traffic by keeping track of information and where it came from and where it should be sent to. Keeping track of the information and its source or destination may involve keeping records of the traffic in the memory of the information management device 30. Then the routing module 108 may instruct the communication modules 104, 106 to direct the information to a particular device 20, 40. Alternatively, the data routing module 108 may tag each packet of information with a source and/or destination identifier, and the identifier may be carried with the information packet when it is sent and received. Then the communication modules 104, 106 may read the tags and direct the information packets to the correct device 20, 40.

In one embodiment, the information management device may only receive information from the other devices 20, 40, once the devices have completed a task and gathered all of the information to be sent at once. In such an embodiment, the information management device must wait for the other devices 20, 40, to complete the task and receive all of the information in bulk.

Another embodiment may allow the information management device 30 to receive information from the other devices in real-time. In this embodiment, the portable vehicle diagnostic tool 20 may send to the information management device 30, the diagnostic information it receives from the vehicle as it receives the diagnostic information. There may be an extremely short lag time to forward the diagnostic information or the portable vehicle diagnostic tool 20 may act as a pass through device so that there is no lag time. Thus, the information from the portable vehicle diagnostic tool 20 is received by the information management device in real-time, without having to wait for the portable vehicle diagnostic tool 20 to complete receiving all of the information it is getting from the vehicle before passing it to the information management device 30.

When information is received from either the portable vehicle diagnostic tool 20 or the networked computing device 40, the information management device 30 may execute the instruction module 110. When executed, the instruction module 110 may evaluate the information received and determine what, if anything, needs to be done with the information and then instruct the information management device 30 to execute further functions for data processing. The instruction module 110 may communicate with other modules discussed herein. In instances where the information is received or sent by the information management device 30 in real-time, the instruction module 110 may also be executed in real-time. Thus, the instruction module 110 may evaluate the information received and determine what, if anything, needs to be done with the information and instruct the information management device 30 to execute further functions for data processing as real-time information is received. In some embodiments, it may not be possible to make a final determination on the information until all of the information is received, however, the evaluation of the information may be executed in real-time so that the time necessary to make the determination on the information is reduced.

In another embodiment, the information management device 30 based on the diagnostic information received from the portable vehicle diagnostic tool 20 can anticipate the information that the user of the portable vehicle diagnostic tool 20 wants to receive as the diagnostic information is being received. This may be done via the instruction module 110 and/or the command module 122 (discussed below). The anticipated information is based on partial information already received from the portable vehicle diagnostic tool 20. That is once enough partial information is received, the information management device 30 can request additional information, such as top fixes, the defective part's number and its availability and have it available to the user of the portable vehicle diagnostic tool 20. The information management device 30 can verify if the anticipated information is still relevant (or is complete) based on the completed diagnostic information received from the portable vehicle diagnostic tool 20 and update the information sent to the user if needed. The information from the networked computing device 40 may be sent to and received by the information management device 30 in real-time.

One function that may be executed after receiving information at the information management device 30 is the pass-through module 112. The instruction module 110 may determine that the information does not need any alteration, yet the information still needs to reach its destination. Thus, the pass-through module 112 may be implemented such that the information received at one end is unaltered and is the same information that is sent out at another end. When the pass-through module 112 is executed in real-time, the information may be passed to its destination as the information is received, rather than waiting for completion of receiving all of the relevant information and then passing the information on.

Other circumstances may require the instruction module 110 to make one or more modifications to the information received at the information management device 30. In one embodiment, the portable vehicle diagnostic tool 20 may have limited functionality such that it cannot provide instructions, or that it can only provide limited instructions, for the handling of the information that the information management device 30 receives from it or sends to it. Thus, the instruction module 110 may have to determine that one or more of the information management device's functions should be implemented to properly handle the information. While various instances of the descriptions of the functions of the various modules may be directed to either the portable vehicle diagnostic tool 20 or the networked computing device 40, one skilled in the art would recognize that any of the functions of the various modules may similarly be applied to the other device 20, 40, respectively.

In one instance, the information management device 30 may receive a raw or unprocessed data sent from the portable vehicle diagnostic tool 20. The instruction module 110 may evaluate the data and determine that no destination for the data has been specified. Then the instruction module 110 may call for the execution of the destination determination module 114, which may determine to which networked computing devices 40 to send all or some of the information. The destination determination module 114 may make this determination based on the type of data, the content of the data, and any indications of what return data is desired. For example, the data may include diagnostic trouble codes for a certain vehicle, thus the destination determination module may direct the data to the networked computing device 40 that can interpret the diagnostic trouble codes for that vehicle. In the same example, there may also be vehicle performance measurements, which the destination determination module 114 may decide should be sent to the networked computing device 40 that is capable of analyzing such data. Further, the data may include an indication that suggestions for addressing any faults or irregularities identified may be requested, thus the request may be sent to the networked computing device 40 capable of fulfilling the request. Each of these networked computing devices 40 may be individual devices or any of them may be combined with another.

In embodiments where the information is received or sent by the information management device 30 in real-time, the destination determination module 114 may be executed in real-time. As, the information is received, the destination determination module 114 may analyze each piece of data as it arrives and assign each piece of data, or a series of pieces of data, an appropriate destination. The data may then be sent off to its destination in real-time.

The raw, or even processed data received by the information management device 30, from either of the devices 20, 40, may not be in a useable format for its destination device. The instruction module 110 may recognize that the format of the data is incorrect for the destination and communicate with the data formatting module 116, which may convert the data into the correct format depending on the destination assigned to the data. For example, the data may be received as raw binary data, however, the destination for the data only accepts data in an extensible markup language (XML) format. Thus, the data formatting module 116 may have to read the received binary data, interpret the meaning of the data, and convert it to XIVIL by parsing the data into, for example, Unicode, and apply the appropriate XML tags to the parsed data to identify the different sections of the data. The formatting module 116 may be able to convert various file formats to other file formats, such as scalable vector file formats, markup language formats, text document formats, database file formats, convert one data format to another data format, convert one communication protocol to another communication protocol, etc.

The formatting module 116 may also be executed in real-time. As the information arrives, and the destination is determined, the information may be analyzed, the current and required formats identified, and the format converted, all in real-time by the formatting module 116. Some information may be passed on in real-time once that portion of the information has been properly formatted. In other instances, the formatting may need to be completed before the information may be passed along. In the latter instance, the formatting may still execute in real-time, reducing the amount of time it would take to complete the formatting process, and finalize the formatting once all of the information is received.

While analysis of the data from the portable vehicle diagnostic tool 20 may occur on the networked computing device 40, it is also considered that the information management device 30 may conduct analysis of this data. Likewise, the information management device 30 may also analyze data received from the networked computing device 40. Upon evaluating the data received, the instruction module 110 may communicate with the data analysis module 118. The analysis conducted by the data analysis module 118 may be dependent on the information received and/or the information needed to send to complete a task. The data analysis module 118 may extract from or convert the data into information that is representative of the data but differently presented to the device for which it is destined. For example, a series of raw vehicle performance measurements or vehicle diagnostic codes from the portable vehicle diagnostic tool 20 may not be useful if the information is to be sent to a networked computing device 40 which requires a descriptive phrase of an issue or symptom. Further, some data may be extensive for practical use in some applications, thus the analysis module 118 may be able to parse sets of data that are too large for practical use into smaller representative sets, or even into single representative values for multiple measurements.

When the information is received, the data analysis module 118 may be executed to analyze the data in real-time. Then the analyzed data could be displayed or sent off to its destination once the analysis is complete, or in real-time. The information does not have to be received in real-time to run the data analysis module 118 in real-time. For a given set of data fully received, the data analysis module 118 may still be executed in real-time displaying or sending the analyzed data in real-time.

A display module 120 may also be executed to display information on the screen of the information management device 30. The information available to the display module 120 may include elements of the GUI for interacting with the information management device 30, and the information received from the other devices 20, 40. The information may be displayed in real-time. For example, information received may be displayed graphically as it is received, or a representation of a data analysis may be displayed as it occurs.

As discussed herein, the portable vehicle diagnostic tool 20 may lack the ability to provide instructions to the information management device 30 and/or the networked computing device 40. The information management device 30 may include the command module 122 for providing the networked computing device 40 with commands, queries, requests, and the like. The command module 122 may determine what information, related to the information received from the portable vehicle diagnostic tool 20, is desired and request that the networked computing device 40 return that information. The determination may be made based on the information management device's analysis of the information provided to it, based on setting set by a user as described herein, or a combination of these. The request may include a query for related information or a command for analysis of the information being provided. Examples of such related information or analysis may include: interpretations of the diagnostic trouble codes and/or vehicle performance measurements; vehicle component failure diagnoses; related symptom information; possible failure and symptom causes; suggested popular or likely fixes for the symptoms and failures; repair statistics for the suggested fixes (e.g. cost, time, difficulty, and likelihood of success to solve the issue); potential issues that may arise because of the existing issue and preventative maintenance advice for the potential issues; peripheral issues that may have contributed to the existing issue that may require attention and fixes for the peripheral issues; parts information (e.g. type, brand, model, specifications, price, availability, location, and technical bulletins); and vehicle information (e.g. vehicle history including accident, repair, maintenance and owners, and technical bulletins).

In one embodiment, real-time implementation of the command module 122 is possible. As information is received by the information management device 30, the determination may be made as to what information is desired and what request is to be made to the networked computing device 40. Moreover, once each determination is made on the information received, the request may also be made in real-time.

An input module 124 on the information management device 30 may serve to receive input signals from the input device of the information management device 30, and to interpret those signals as commands. Some such commands may include controlling the information on the display of the information management device 30, thus executing the display module 120 to alter the GUI and/or displaying the information received from the devices 20, 40. Other commands may initiate the settings module 126, which may alter and save various setting of the information management device 30. The settings module 126 may affect setting of the information management device 30 that affect how the instruction module 110 evaluates information and determines how to handle the information. For example, settings may include the information sought in return after sending data to the networked computing devices 40. In turn, this may affect how the instruction module 110 determines which functions of the information management device 30 to call. The settings may further affect the manner in which those functions interact with the data. A setting for retrieving a certain type of information may influence the destination determination module 114 to identify a particular networked computing device 30 to send the data to, the data formatting module 116 may display further options for settings or data relating to the certain type of data, and the data analysis module 118 may analyze and/or manipulate data to achieve completion of the request.

The input module 124 may also be executed in real-time. For the most part, when the information management device 30 is not busy executing other tasks, the input module 124 is ready to be executed when an input is received. However, if the information management device 30 is running another process, the input module 124 may not execute until the running process is completed. The action to execute the input module 124 may be put in a process queue, or disregarded when another process is running. In a real-time execution of the input module 124, the input module 124 may respond to an input as it is received, regardless of other implemented processes. In one embodiment, the input module 124 may interrupt a running process, such as to stop the process from continuing to run. This may be the favored execution when modifications to functions may be desired as they are running on the information management device 30. In another embodiment, the input module 124 may run as a parallel process to another running process. This implementation may be useful when handling multiple data sources at once, and not having to wait for a process to end to manage an unrelated process is more efficient.

Figure 3:
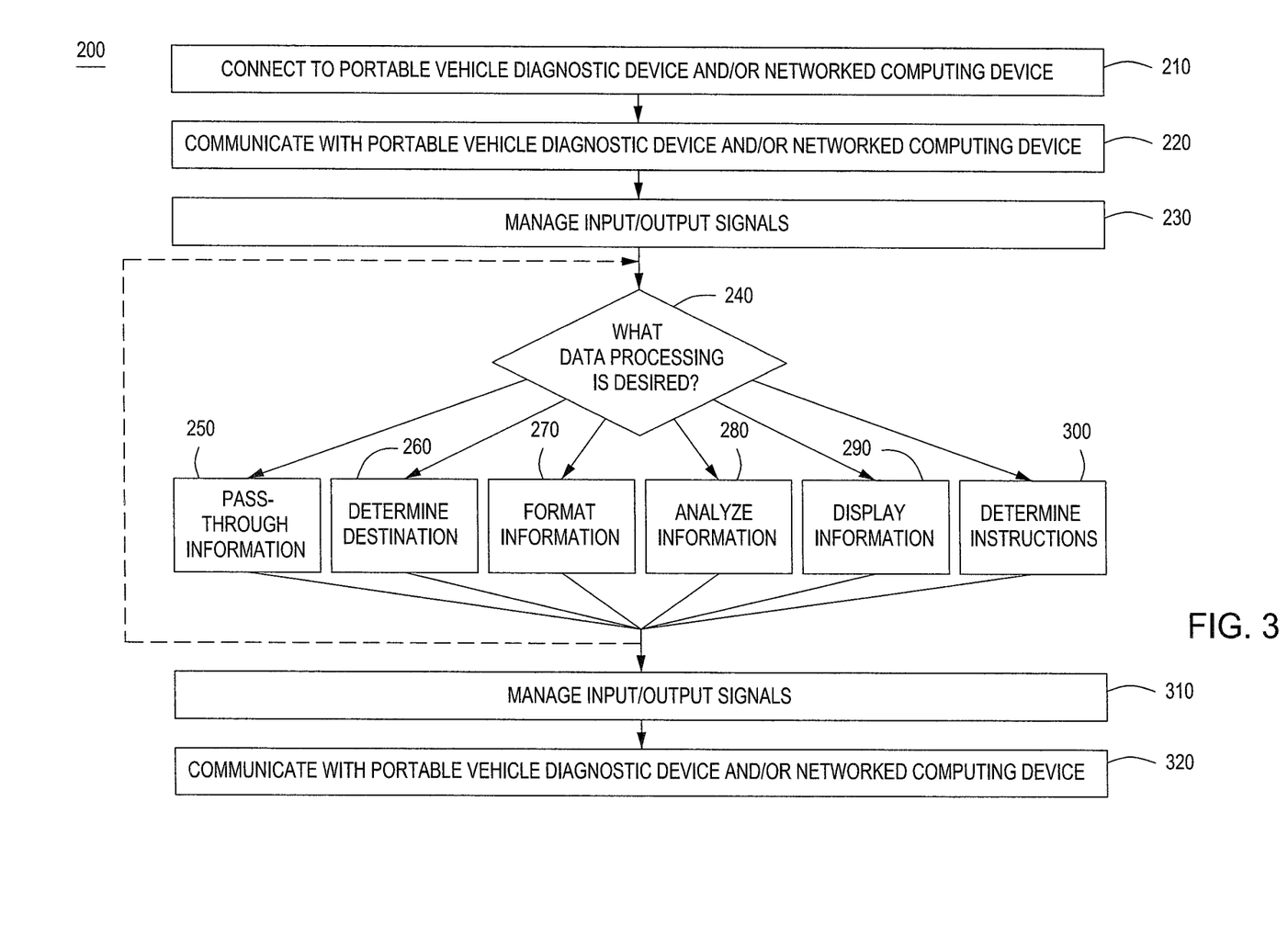
FIG. 3 is a flowchart illustrating steps that may be followed to manage information between a diagnostic tool and networked computing devices according to an embodiment of the invention.

Referring now to FIG. 3, illustrated is a flow diagram of a method for managing information between the portable vehicle diagnostic tool and the networked computing device 200. In the method 200, the steps described may occur in a various orders and combinations. The description herein is exemplary and not meant to be limiting. In one embodiment, any of the following steps may be executed in real-time as described herein.

The method 200 may begin by connecting to the portable vehicle diagnostic tool 20 and/or the networked computing device 40 (step 210). Connecting the information management device 30 to one or more of the other devices 20, 40, may involve listening for a connection request from the other devices 20, 40. A connection request may be received by the information management device 30 from either or both of the other devices 20, 40. The connection request may be received from one or both of the devices 20, 40, to setup a new connection with the information management device 30, for example, for the first time or to establish a new connection after a previous connection was terminated after completion of a communication session. In some instances the communication session may have been interrupted before it is complete, and the connection request may be received to reestablish the connection for the interrupted communication session. Once receiving the connection request, the information management device 30 may send a confirmation signal to establish the connection, or send a rejection signal or no signal to refuse the connection.

In another embodiment step 210 may include the information management device 30 sending a connection request to one or more of the other devices 20, 40. Rather than waiting for a connection request, the information management device 30 may be prompted by a user to setup a connection. Thus, the information management device 30 may issue a request to connect to the other devices 20, 40. After sending the connection request, the information management device 30 may wait for the confirmation signal from the other device 20, 40, establishing the connection, or the rejection signal from the other device 20, 40 refusing the connection. If no response signal is received by the information management device 30 after a specific amount of time, the information management device 30 may resend the request to connect. The process of waiting for a response signal and resending the request to connect may be repeated a set number of times. If, after the set number of times is reached without a response, the information management device 30 may attempt to connect to a different one of the other devices 20, 40, or indicate that the connection attempt has failed.

Once a connection between the information management device 30 and one or more of the other devices 20, 40 has been established (step 210), the information management device 30 may communicate with the connected device 20, 40 (step 220). In communicating with the connected devices 20, 40, the information management device 30 may send and receive queries and requests for data. The information management device 30 may also transmit and receive data in the form in which the data was received or in an altered form, where the data is altered by the information management device 30. Examples of the information management device 30 communication may include the information management device 30 querying the networked computing device 40 for information related to data received from the portable vehicle diagnostic tool 20, or querying the portable vehicle diagnostic tool 20 for data related to information from the vehicle under service. Another example may include the information management device receiving information from either device 20, 40 and sending it to the other device 20, 40, either in the form it was received or in an altered form. The information management device 30 may also receive information from and send information to the same device 20, 40, without communicating with the other device 20, 40. It is also possible for the information management device 30 to send information without first receiving information or a request for information, or receive information without subsequently sending any information.

The information management device 30 may also manage the input/output signals it receives/sends (step 230). In one embodiment, this is done in real time. Managing the input/output signals may involve keeping track of the source of input signals, the destination of output signals, and the order in which to handle the signals. In keeping track of the signals, the information management device 30 may read information tagged with an identification of where it came from and where it may be going. Alternatively, the information management device 30 may have to apply source and/or destination tags to information packets. Part of keeping track of the signals may involve keeping a record in memory of the location, destination, and time or order which information packets are received or sent. In this step, the information management device 30 may have to keep track of information from multiple sources. For example, the information management device 30 may be used in connection with more that one portable vehicle diagnostic tool 20, and may be required to keep track of what data came from and should be sent to which portable vehicle diagnostic tool 20. A similar situation may apply to more than one networked computing device 40. This may be by identifying information that is received with the packets from the devices 20, 40.

When the information management device 30 has information, it may determine if any data processing is desired by the user or based on the information received (step 240). In some instances the information management device 30 may determine that the information received, from either the portable vehicle diagnostic tool 20 or the networked computing device 40, is desired to be passed to its destination without any other processing. In such an instance, the information device 30 passes-through the information (step 250) without further processing. In the circumstance where the information management device 30 acts as a pass-through for the information, the information likely includes location tags for its source and destination. The information does not have to be correctly formatted because it may be possible that the destination device for the information may be able to format the information once it is received.

In some instances, the information management device 30 may have to determine the destination for information it has received (step 260). Unlike the previous step 230, at step 260 the information management device 30 may have to analyze the data to determine where to send it, as opposed to keeping track of data. The information management device may make the determination based on one or more factors. Such factors may include the content and/or format of the data, an indication of a desired returned result or information, such as a setting or option selection, the availability or location of one or more destination devices 20, 40, or the amount of traffic on the communication network 50. By analyzing the data the information management device 30 has, it may be able to match the content or the format of the information with the input requirements or ability to accept the information with specific networked computing devices 40. For example, if the information management device 30 receives the diagnostic test results for a vehicle's electronic safety control system from the portable vehicle diagnostic tool 20, then based on the information, the information management device 30 may determine that there is a networked computing device 40 that can handle requests for data or analysis related to the vehicle's electronic safety control system. Such a networked computing device 40 may be programmed for specific vehicles, safety systems, electronic systems, a combination of systems or vehicles, or may be generally able to handle all requests.

Different devices 20, 40 are not necessarily programmed so that they produce standardized outputs. In some instances, for the devices 20, 40 to be able to communicate with each other, the information management device 30 may have to format the data that it receives from and sends to the devices 20, 40 (step 270). It is possible that different manufactures or even different equipment from the same manufacturer use different formats or communication protocols. Even the vehicles under test may provide information differently to the portable vehicle diagnostic tool 20. Sometimes, the information received by the information management device 30 from the devices 20, 40, may be in a format that is not recognized or is not useable if it was simply passed on to the other device 20, 40. The information management device 30 in knowing the destination of the information that it sends may also know the formats which are acceptable to the destination device 20, 40. In those circumstances, the information management device 30 may the format data, while keeping the integrity of what the data represents, so that it is acceptable for the destination device 20, 40.

The information management device 30 may also be capable of doing its own data analysis (step 280). In some instances the data provided by the devices 20, 40, may need further refinement to be used by the other devices 20, 40 or to be understood by a user. For, example, the portable vehicle diagnostic tool 20 may provide to the information management device a record of measurements taken of engine performance during testing. The record may contain data over an extended period of time of numerous engine parts and systems that were monitored and recorded during the testing. The information management device may be instructed to retrieve information relating to the engine valve timing data recorded. Alternatively the information management system 30 may analyze the data and determine that there is an issue with the engine valve timing, and may determine to retrieve information relating to the engine valve timing data recorded. In either situation, the information management device 30 may analyze, or further analyze, the data to extract the engine valve timing measurements and data closely related to engine valve timing that may affect the engine valve timing. In some embodiments the data may also be analyzed to determine where abnormalities occurred and those portions may be indicated or extracted from the rest of the data. Other embodiments may provide a summary analysis of the data when the amount of data is too large to send and a representative summary of the data is sufficient.

An embodiment of the information management device 30 may provide a display. In some circumstances, for example, the display of the information management device 30 is preferred for viewing information over the display of the portable vehicle diagnostic tool 20. In this embodiment, the information management device 30 may display the information it has received and/or altered (step 290) to the user. The display is not limited to information that it has received from the devices 20, 40, or any alterations thereof. The information management device 30 may display options through its GUI for managing, analyzing, and formatting the information.

Another step in the method may include determining instructions for the other devices 20, 40 (step 300). As discussed herein, the information management device 30 may have the ability to analyze data it receives to determine what type of information is desired. The information management device 30 may also make this determination based on user settings that have specified the desired return information for a specific instance or for a type of data provided. A command, request, query, or the like is associated with the information that is sent to the other device to instruct it on what to do with the information or inform it what information is desired in return.

When determining if any data processing is desired (step 240), the information management device 30 may determine that one or more of the data processing functions (steps 250-300) needs to be conducted. The data processing functions (steps 250-300) may occur in parallel, in series, or in various orders determined by the processor of the information management device 30. Further, the steps 250-300 may be performed so that the processing of the data and return of the information can be done in real time.

After the information management device has determined if any data processing is desired (step 240), and it has executed its data processing functions (steps 250-300), then the information management device may again manage the input/output signals (step 310) much like in step 230, and communicates with the devices 20, 40 (step 320) much like in step 220.

FIGS. 1, 2, and 3 are diagrams and flowcharts of methods and systems according to various embodiments of the present invention. It will be understood that each step of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIGS. 1, 2, and 3 depict the system of various embodiments potentially including a general-purpose computer by which the embodiments of the present invention may be implemented. Those of ordinary skill in the art will appreciate that a computer can include many more components than those described herein. However, it is not necessary that all of these generally conventional components be shown in order to disclose an illustrative embodiment for practicing the invention. The general-purpose computer can include a processing unit, and a system memory, which may include random access memory (RAM) and read-only memory (ROM). The computer also may include nonvolatile storage memory, such as a hard disk drive, where additional data can be stored.

An embodiment of the present invention can also include one or more input devices, such as a mouse, keyboard, and the like. A display can be provided for viewing text and graphical data, as well as a user interface to allow a user to request specific operations. Furthermore, an embodiment of the present invention may be connected to one or more remote computers via a communication device. The connection may be over a communication network 50, such as a local area network (LAN) wide area network (WAN), and can include all of the necessary circuitry for such a connection.

Typically, computer program instructions, such as portions of the method for managing information between the portable vehicle diagnostic tool and the networked computing device 200, may be loaded onto the computer or other general purpose programmable machine to produce a specialized machine, such that the instructions that execute on the computer or other programmable machine create means for implementing the functions specified in the flowchart. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the flowchart.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the flowchart steps.

Accordingly, steps of the flowchart support combinations of means for performing the specified functions, combinations of steps for performing the specified functions and program instruction means for performing the specified functions. It will also be understood that each step of the flowchart, as well as combinations of steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A base computing device for managing information between a portable vehicle diagnostic tool and a networked computing device over a communication network, the base computing device comprising:
   a processor configured to execute modules;
   a memory configured to store the modules; and
   a communication interface configured to wirelessly communicate with the portable vehicle diagnostic tool and the networked computing device over the communication network, wherein the communication interface allows diagnostic information including signals, in real time to be exchanged between the portable vehicle diagnostic tool and the networked computing device, wherein the signals are received partially without having to wait for the portable vehicle diagnostic tool to complete receiving all of the diagnostic information before passing the diagnostic information to the base computing device, and wherein the modules include:
      an instruction module configured to determine whether to execute one of the modules that is configured to process signals received from the portable vehicle diagnostic tool or the networked computing device, wherein the instruction module is further configured to request top fixes information, or a defective part's number based on the partial diagnostic information received from the portable diagnostic tool and updates, if needed, the top fixes or the defective part's number information based on a completed diagnostic information received from the portable diagnostic tool;

a format module configured to reformat the information for use by the portable vehicle diagnostic tool or the networked computing device;

a data analysis module configured to extract portions of data from the information and convert the information into another form while being representative of the data; and a pass-through module configured to transmit the signals to and from the portable vehicle diagnostic tool and the networked computing device with information represented in the signals that is in same condition as received, wherein the information represented in the signals that is in same condition as received includes location tags for a source and a destination of the information;

wherein the partial diagnostic information received from the portable diagnostic tool includes diagnostic information about component failures from the vehicle under test, including diagnostic and failure codes, performance measurements, and part identifiers; and wherein the partial diagnostic information received from the portable diagnostic tool is processed in the base computing device, to analyze the data to determine where to send the data and what type of information is desired from the network computing device.

2. The base computing device of claim 1, wherein the modules further comprises:
a command module configured to associate an instruction with the signals to instruct the networked computing device on a desired return information.

3. The base computing device of claim 1, wherein the modules further comprise:
an input module configured to keep track of a source and a destination of the signals and to tag the signals with the source and destination.

4. The base computing device of claim 1, wherein the modules further comprises:
a communication module configured to create a communicative connection between the processor and the portable vehicle diagnostic tool, and the processor and the networked computing device.

5. The base computing device of claim 1, wherein the modules further comprises:
a display module configured to display information on a display of the base computing device.

6. The base computing device of claim 1 further comprising a command module configured to request top fixes information from the networked computing device based on partial diagnostic information received from the portable diagnostic tool.

7. A method for managing information between a diagnostic tool and a networked computing device over a communication network, comprising the steps of:
connecting wirelessly a base computing device to the diagnostic tool and the networked computing device over the communication network via a communication interface of the base computing device;
receiving signals in real time representative of information from the diagnostic tool or the networked computing device via the communication interface, wherein the signals are partially received without having to wait for the diagnostic tool to complete receiving all of the information before passing the information to the base computing device;

determining in real time whether to execute an information processing function, stored in a memory of the base computing device, via a processor of the base computing device;

executing one or more of the information processing functions via the processor if the determination was made to execute the information processing function;

passing the signals in real time, using a pass-through module stored in the memory of the base computing device, to and from the diagnostic tool and the networked computing device if the determination was made not to execute the information processing function, wherein the information represented in the signals is in same condition as received and includes location tags for a source and a destination of the information;

determining, via the processor and a destination determining module stored in the memory of the base computing device, a destination for the signals received;

formatting, via the processor and a format module stored in the memory of the base computing device, the information received for use by the diagnostic tool or the networked computing device;

analyzing, via the processor and a data analysis module stored in the memory of the base computing device, the information received by extracting portions of data from the information or converting the information into a representative form;

requesting, with an instruction module, top fixes information, or a defective part's number based on the partial information received from the diagnostic tool;

updating, if needed, the top fixes or the defective part's number information based on a complete diagnostic information from the diagnostic tool; and sending output signals in real time to the diagnostic tool representative of a returned information based on the information received from the diagnostic tool via the communication interface;

wherein the partial information received from the portable diagnostic tool includes diagnostic information about component failures from the vehicle under test, including diagnostic failure codes, performance measurements, and part identifiers; and wherein the partial information received from the portable diagnostic tool is processed in the base computing device, to analyze the data to determine where to send the data and what type of information is desired form the network computing device.

8. The method of claim 7, wherein executing the information processing function further comprises passing through the information, via the processor, to and from the diagnostic tool or the networked computing.

9. The method of claim 7, wherein executing the information processing function further comprises determining, via the processor, a command to instruct the networked computing device on a desired return information based on the diagnostic tool information.

10. The method of claim 7 further comprising the step of: managing the signals by keeping track of a source and a destination of the signals by tagging, via the processor, the signals with the source and destination.

11. The method of claim 7 further comprising:
requesting top fixes information from the networked computing device, via the processor and a command module, based on partial diagnostic information received from the diagnostic tool.

12. The method of claim 7 further comprising:
displaying information on a display of the base computing device, via a display module stored in the memory of the base computing device.

13. A base computing device for managing information between a portable vehicle diagnostic tool and a networked computing device over a communication network, the base computing device comprising:
means for processing modules;
means for storing the modules; and
means for wirelessly communicating with the portable vehicle diagnostic tool and the networked computing device over the communication network, wherein the means for wirelessly communicating allows diagnostic information including signals, in real time to be exchanged between the portable vehicle diagnostic tool and the networked computing device, wherein the signals are received partially without having to wait for the portable vehicle diagnostic tool to complete receiving all of the diagnostic information before passing the diagnostic information to base computing device, and wherein the modules include:
an instruction module configured to determine whether to execute one or more modules that is configured to process signals received from the portable vehicle diagnostic tool and the networked computing device, wherein the instruction module is further configured to request top fixes information, or a defective part's number based on the partial diagnostic information received from the portable diagnostic tool and updates, if needed, the top fixes or the defective part's number information based on a complete diagnostic information received from the portable diagnostic tool;
a destination determination module configured to determine whether to route the signals to the portable vehicle diagnostic tool or the networked computing device;
a format module configured to reformat the information for use by the portable vehicle diagnostic tool to the networked computing device;
a data analysis module configured to extract portions of data from the information and convert the information into another form while being representative of the data; and
a pass-through module configured to transmit the signals to and from the portable vehicle diagnostic tool and the networked computing device with information represented in the signals that in same condition as received, wherein the information represented in the signals that is in same condition as received includes location tags for a source and a destination of the information;
wherein the partial diagnostic information received from the portable diagnostic tool includes diagnostic information about component failures from the vehicle under test, including diagnostic and failure codes, performance measurements, and part identifiers; and
wherein the partial diagnostic information received from the portable diagnostic tool is processed in the base computing device, to analyze the data to determine where to send the data and what type of information is desired from the network computing device.

14. The base computing device of claim 13, the modules further comprises:
a command module configured to associate an instruction with the signals to instruct the networked computer on a desired return information.

15. The base computing device of claim 13, wherein the modules further comprise:
an input module configured to keep track of a source and a destination of the signals and to tag the signals with the source and destination.

16. The base computing device of claim 13, wherein the modules further comprise:
a communication module configured to create a communicative connection between the processor and the portable vehicle diagnostic tool, and the processor and the networked computing device.

17. The base computing device of claim 13, wherein the modules further comprises:
a display module configured to display information on a display of the base computing device.

18. The base computing device of claim 13 further comprising a command module configured to request top fixes information from the networked computing device based on partial diagnostic information received from the portable diagnostic tool.

* * * * *